June 5, 1962　　　M. E. FORDYCE　　　3,037,596
TRIM PANEL FASTENER
Filed Jan. 28, 1960
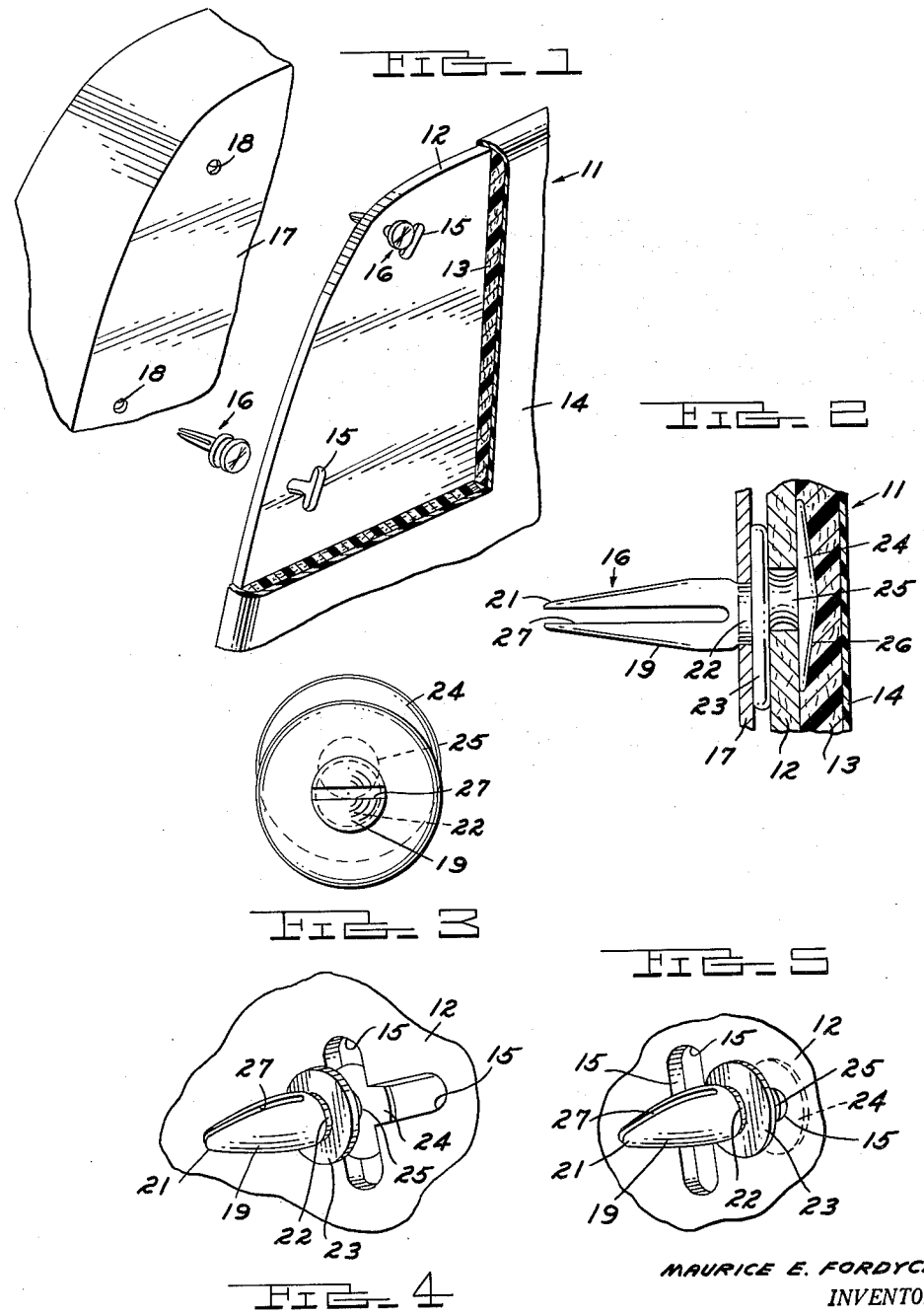
MAURICE E. FORDYCE
INVENTOR.
BY
J. R. FAULKNER
J. J. ROETHEL
ATTORNEYS United States Patent Office 3,037,596
Patented June 5, 1962

3,037,596
TRIM PANEL FASTENER
Maurice E. Fordyce, Farmington, Mich., assignor to Ford Motor Company, Dearborn, Mich., a corporation of Delaware
Filed Jan. 28, 1960, Ser. No. 5,158
7 Claims. (Cl. 189—88)

This invention relates to a press-in stud type trim panel fastener particularly adapted for use in motor vehicles.

Press-in stud type trim panel fasteners formed of wire or sheet metal having a wide variety of shapes and configurations are well exemplified in the prior art relating to these devices. Many of these fasteners are specifically for the purpose of securing trim panels of fiberboard or the like to sheet metal vehicle body structures. These metal fasteners all have at least two inherent disadvantages. First, the metal against metal relationship is undesirable as a potential source of squeaking noise. Second, these fasteners do not seal the holes in the body sheet metal against possible dust and water penetration between the body metal and trim panel.

It is an object of the present invention to provide a simple and efficient press-in stud type fastener constructed and arranged so that it may be readily molded of a nonmetallic material such as a polyethylene or equivalent type plastic. In its illustrated embodiment, the stud fastener comprises an elongated shank portion provided with axially spaced upper and lower head portions, the upper head portion being eccentrically positioned relative to the lower head portion. The eccentric relationship of the heads permits circumferential adjustment of the stud fastener to accommodate misalignment of the stud holes in the trim panel with the holes in the body structure to which the panel is to be attached. The lower of the two heads is adapted to contact the surface of the body structure adjacent the stud receiving hole to help seal the area against water and dust leaks. Since the fastener is molded of nonmetallic material such as a plastic, there is no metal to metal contact which could produce any squeaking noises.

Other objects and advantages of the present invention will be made more apparent as this description proceeds, particularly when considered in connection with the accompanying drawings, wherein:

FIG. 1 is an exploded fragmentary perspective view showing the relationship of the trim panel, trim panel fastener embodying the present invention, and the body structure to which the trim panel is to be fastened.

FIG. 2 is a fragmentary view in part sectional illustrating the assembled relationship of the trim panel, fastener and body structure member;

FIG. 3 is a bottom view of the stud fastener; and

FIGS. 4 and 5 are fragmentary perspective views illustrating the steps in assembling the fastener to the trim panel prior to the assembly of the trim panel to the body structure.

Referring now more particularly to the drawing, it will be noted that FIG. 1 illustrates a trim unit 11. The trim unit is usually furnished as a preassembly and comprises a fiberboard trim panel 12 covered by a foundation layer 13 of resilient material. The foundation layer 13 may be a cellulose acetate-wool fiber composition material. The foundation layer 13 is covered by an ornamental layer of material 14 which may be a vinyl plastic, leather, broadcloth or the like. The trim panel 12 is provided with a series of T-shaped slots 15 adapted to receive the head portion of the stud fasteners, herein generally designated 16. The stud fasteners are usually inserted in the trim units 12 shortly before the assembly of the trim unit into the vehicle body.

The vehicle body structure 17 receiving the trim unit is indicated as having circular apertures 18 adapted to receive the stud fasteners 16.

Each stud fastener 16 embodying the present invention comprises an elongated conoidal shank 19 provided at one end with a rounded blunt portion 21. The shank 19 is undercut at its other end to provide a cylindrical shoulder portion 22. The cylindrical shoulder portion 22 is capped by a pair of axially spaced or dual head portions 23 and 24. The head portions 23 and 24 are integrally connected to each other by a cylindrical spacer portion 25. The lower head portion 23 comprises a substantially flat circular disk. The upper head portion is flat on its underside but formed with a flat conical surface 26 on its upper side.

It will be noted that the longitudinal axis of the cylindrical spacer portion 25 is offset from the longitudinal axis of the shank 19. The lower end portion 23 is concentric with the shank 19 while the upper head portion 24 is concentric with the cylindrical spacer portion 25. This results in the upper head portion 24 being eccentrically located with respect to the lower head portion 23, for a reason to be explained.

As was stated above, the trim unit 11 is usually furnished in a preassembled condition, except for the fastening devices 16. These are usually inserted just prior to assembly of the trim unit 11 into the vehicle.

FIGS. 4 and 5 illustrate the steps in the assembly of the fasteners to the trim panel. First the head portion 24 is inserted through the crossbar of the T-shaped slot 15.

It will be understood that it will be necessary to tilt the fastener 16 slightly as the head portion 24 is inserted through the crossbar of the T-shaped slot 15, see FIG. 4. The tapered or flat conical upper surface 26 of the head 24 enables it to slide between the trim panel 12 and the foundation layer 13. The spacer portion 25 is then urged down the vertical leg of the T-shaped slot 15 to the position shown in FIG. 5. Usually all of the fasteners 16 are inserted in the panel at the same time. Frequently, a number of panels are arranged with the fasteners and then lightly stacked alongside the vehicle assembly line.

The fasteners 16 embodying the present invention provide several advantages over the conventional metal or wire formed types of fasteners. First, the wire or sheet metal type fasteners frequently have a sharp edge or two on them. As a result, when the trim units 11 are lightly stacked or are handled to transfer them from one place to another, the outer ornamental fabric or covering material 14 is frequently torn by the sharp edge of the metal or wire fasteners, when the person assembling the fasteners to the trim unit 11 reaches into the barrel or bin containing many of them, the sharp edges pierce or puncture the skin on his hand causing a time loss injury. Or the intricate configurations and forms of many of these metal or wire fasteners resulted in them becoming tangled requiring loss of time in separating them. The present fastener 16, being readily moldable of nonmetallic or plastic materials, has none of the foregoing disadvantages. There are no sharp edges and there is no way for the fasteners to become entangled with one another.

After the installation of the fasteners 16, the trim unit 11 is ready for assembly to the body section or structure 17. The installer of the trim unit 11 can readily tell by a quick visual inspection whether or not the fasteners are in proper alignment with the holes 18 in the body structure panel 17. If they are not, a slight manual rotation of the fastener is all that is required to shift the axial alignment of the shank 19 so that it will be in proper alignment with the center of the aperture 18. The degree of eccentricity between the spaced portion 25 and the axially extending shank 19 controls the amount of adjustment that can be made. However, within the limits of the tolerances permitted and controlling the location of the holes 18 in the body panel structure 17 and the T-shaped slots 15 in the panel 12, all of the fasteners 16 may be positioned for optimum alignment with the receiving apertures 18.

Upon the shanks 19 being axially aligned with the respect to the apertures 18, it is only necessary to exert finger pressure on the outer side of the trim unit 11 to snap the shank portions through the apertures 18. The elongated slot 27 in each shank portion 19, permits the shank to yield sufficiently to make the entry of the shank through the aperture 18 an easy one. The diameter of each aperture 18 corresponds to the diameter of the shoulder portion 22 of the shank 19. It will be readily apparent that upon the shank portion 19 being forced all the way through the metal 17, the fastener stud will be retained by the shoulder of the undercut portion 22 to maintain the trim unit in installed position.

Since the fastener 16 is preferably molded of a plastic material, there is no metal to metal contact with the metal panel 17 such as would cause any squeaking noises upon flexing of the trim unit 11 relative to the body structure 17. Further, the size of the head portion 23 is such that it substantially overlies the area surrounding the aperture 18 providing an effective water tight and dust tight seal. When metal or wire clips are used, it has been the practice to seal the hole with a rope sealer or caulking compound. This extra operation is believed to be eliminated by the use of the plastic type fastener embodying the present invention.

It will be understood that the invention is not to be limited to the exact construction shown and described, but that various changes and modifications may be made without departing from the spirit and scope of the invention, as defined in the appended claims.

What is claimed is:

1. In combination, a trim unit including a panel having a T-shaped slot therein and a stud fastener comprising a shank part and a head part integral therewith, said head part comprising two spaced elements having substantially parallel opposed surfaces, said spaced elements being connected to each other by a spacer portion extending between said opposed surfaces, the longitudinal axis of said spacer portion being laterally offset from the longitudinal axis of said shank part, the outer of said spaced elements being inserted through the crossbar of said T-shaped slot to cause said panel to be engaged between said opposed surfaces, said spacer portion being adjustable along the length of the leg portion of said T-shaped slot, said fastener being rotatable in said slot about the axis of said spacer portion to provide for alignment of said shank part with a receiving aperture.

2. In combination, a trim unit including a panel having a T-shaped slot therein and a stud fastener comprising a shank part and a head part integral therewith, said head part comprising two spaced elements having substantially parallel opposed surfaces, said spaced elements being connected to each other by a spacer portion extending between said opposed surfaces, the longitudinal axis of said spacer portion being laterally offset from the longitudinal axis of said shank part, at least one of said spaced elements being in axial alignment with said spacer portion, the outer of said spaced elements being inserted through the crossbar of said T-shaped slot to cause said panel to be engaged between said opposed surfaces, said spacer portion being adjustable along the length of the leg portion of said T-shaped slot, said fastener being rotatable in said slot about the axis of said spacer portion to provide for alignment of said shank part with a receiving aperture without affecting the relationship between said panel and said one element.

3. In combination, a trim unit including a panel having a T-shaped slot therein and a stud fastener comprising a shank part and a head part integral therewith, said head part comprising two spaced elements having substantially parallel opposed surfaces, said spaced elements being connected to each other by a spacer portion extending between said opposed surfaces, the longitudinal axis of said spacer portion being laterally offset from the longitudinal axis of said shank part, at least the outer of said spaced elements being in axial alignment with said spacer portion, the outer of said spaced elements being inserted through the crossbar of said T-shaped slot to cause said panel to be engaged between said opposed surfaces, said spacer portion being adjustable along the length of the leg portion of said T-shaped slot, said fastener being rotatable in said slot about the axis of said spacer portion to provide for alignment of said shank part with a receiving aperture without affecting the relationship between said panel and said outer element.

4. A stud fastener comprising a shank part and a head part integral therewith, said head part comprising two elements having spaced substantially parallel surfaces adapted to engage a panel therebetween, said elements being connected by a spacer portion, the longitudinal axes of said shank part and said spacer portion being laterally offset with respect to one another, each of said elements being symmetrically disposed relative to one of said axes.

5. A stud fastener comprising a shank part and a head part integral therewith, said head part comprising two elements having spaced substantially parallel surfaces adapted to engage a panel therebetween, said elements being connected by a spacer portion disposed inwardly of the peripheral edge of each of said elements, the longitudinal axes of said shank part and said spacer portion being laterally offset with respect to one another.

6. In combination, a trim unit including a panel having an aperture formed therein and a stud fastener comprising a shank part having a longitudinal axis and a head part integral therewith, said head part comprising two spaced elements having substantially parallel opposing surfaces, said elements being connected by a spacer portion disposed inwardly of the peripheral edge of each of said elements, said spacer portion extending through said aperture with said opposing surfaces engaging said trim panel, said shank part being adapted to be received in a stud receiving aperture, the longitudinal axes of said shank part and said spacer portion being laterally offset with respect to one another whereby rotation of said fastener about one of said axes compensates for misalignment of said aperture.

7. In combination, a trim unit including a panel having an aperture formed therein and a stud fastener comprising a shank part having a head part integral therewith, said head part comprising two spaced elements having substantially parallel opposing surfaces, said elements being connected by a spacer portion disposed inwardly of the peripheral edge of each of said elements, said spacer portion extending through said aperture with said opposing surfaces engaging said trim panel, said shank part being adapted to be received in a stud receiving aperture, the longitudinal axis of said shank part and said spacer portion being laterally offset with respect to one another whereby rotation of said fastener about one of said axes compensates for misalignment of said apertures.

References Cited in the file of this patent

UNITED STATES PATENTS

| | | |
|---|---|---|
| 908,737 | Broughton | Jan. 5, 1909 |
| 1,097,185 | Oehrle | May 19, 1914 |
| 2,585,285 | Tonge et al. | Feb. 12, 1952 |
| 2,627,094 | Bedford | Feb. 3, 1953 |
| 2,722,294 | Lagaard | Nov. 1, 1955 |